April 23, 1929.  R. F. CAREY  1,710,567

HYDRAULIC PUMP, MOTOR, BRAKE, TRANSMISSION GEAR, AND THE LIKE

Filed Oct. 10, 1927

Inventor
Robert F. Carey
By James L. Norris
Attorney

Patented Apr. 23, 1929.

1,710,567

UNITED STATES PATENT OFFICE.

ROBERT FALKLAND CAREY, OF LEIGH-ON-SEA, ENGLAND, ASSIGNOR OF TWO-THIRDS TO JOHN ROBSON, OF CLAREVILLE, CATERHAM VALLEY, ENGLAND; AGNES MAUDE CAREY ADMINISTRATRIX OF SAID ROBERT FALKLAND CAREY, DECEASED.

HYDRAULIC PUMP, MOTOR, BRAKE, TRANSMISSION GEAR, AND THE LIKE.

Application filed October 10, 1927, Serial No. 225,316, and in Great Britain October 14, 1926.

This invention relates to that class of hydraulic pump, motor, brake or hydraulic transmission gear, i. e. a combination of pump and motor, or like apparatus, in which a revolving block or rotor has formed in it, or carries, a plurality of cylinders, parallel or approximately parallel to the axis of rotation, in which work pistons, each piston being provided with a sliding connector which works against and in conjunction with a non-rotatable angle or swash plate to impart reciprocating motion to the pistons, the sliding connectors being attached to the pistons by some form of hinge or universal joint.

In such machines, the cylinders are provided with ports which work in conjunction with a valve or fluid distributor in which the inlet and outlet passages are formed in such a manner that each cylinder is placed in communication with inlet and outlet in proper sequence. The valve or fluid distributor may be of any known type, for instance, it may be formed as a flat valve plate against which the end of the rotor remote from the swash plate works, the cylinder ports being formed in the end of the rotor, or the cylinder ports may be formed in the periphery of the rotor and the rotor work a close running fit in the bore of the fluid distributor that surrounds it.

The swash plate may be permanently fixed at an angle to the axis of rotation, or it may be capable of being altered in angularity in order to vary the quantity or reverse the flow of the liquid.

The objects of this invention are to simplify and cheapen the construction of such machines, to relieve friction and prevent wear by using the hydraulic pressure to the system to balance or partially balance thrusts and relieve pressure between the working parts; to hold the working parts up to their work; to prevent tilt or reversal of stress between the working parts; and to allow the machine to run efficiently, more silently, and with less vibration, at higher speeds and at greater hydraulic pressures than at present.

The invention consists in improvements in connection with the hinged connectors whereby the hydraulic pressure in the system is used to relieve the thrust between the connectors and the swash plate and to lubricate the rubbing surfaces thereof; improvements in construction whereby tilting of the connectors on the swash plate, or of the pistons in the cylinders, is avoided; and an improved construction whereby the pistons are kept up to the connectors and the connectors up to the swash plate in order to prevent reversal of stress between the working parts.

In the accompanying drawings:—

Figure 1:
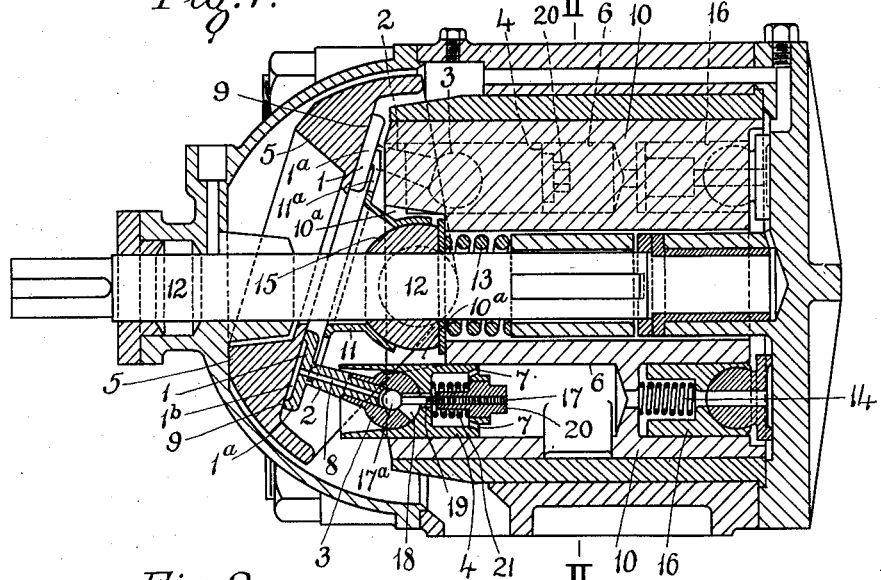
Figure 1 is a section of a single ended machine embodying the invention.
Figure 2:
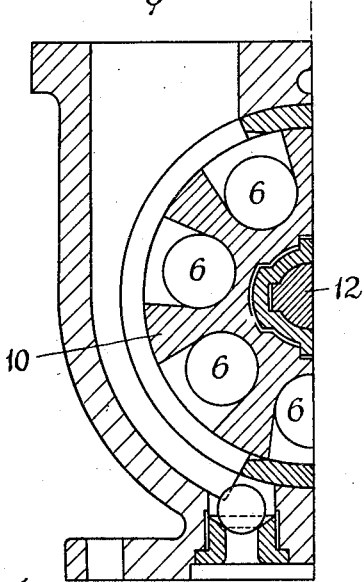
Fig. 2 is a half section through the line II—II of Figure 1.

If the parts on the left-hand side of the line II—II of Fig. 1 be duplicated but reversed, a double ended machine having two sets of pistons and two swash plates would be the result.

In carrying the invention into practice, it is preferable to make the connectors 1 in the form of a circular or similarly shaped plate or flange $1^a$ to slidably engage the swash plate 5, each connector having a stem 2 with a spherical end 3 which enters the piston 4 or, on the other hand, the spherical head may enter the swash plate 5 to form a ball and socket universal joint, the face of the connector remote from the piston forming the rubbing surface that slides against the non-rotatable swash plate 5.

In order to reduce friction and wear between the plate engaging end $1^a$ and the swash plate 5, liquid or fluid under pressure is admitted from the cylinder 6 through holes 7 in the piston 4 and a hole 8 through the stem 2 of the connector so that said liquid or fluid acts between the flange $1^a$ and the swash plate 5 to balance or nearly balance the thrust of the piston 4. For this purpose it is preferable to recess, as at $1^b$, the flange face to give a definite area on which the full pressure can act, such recess $1^b$ being surrounded by a flat surface or lap 9 to keep the joint.

Where oil is used as a liquid medium, the thrust between the surfaces is not only balanced, or nearly balanced, but the surfaces are lubricated in a most efficient manner by this arrangement, as the oil is constantly being forced outward by the pressure, thus forming a film between the surface of the lap 9 and the swash plate 5.

In machines of the character to which this invention relates, the power is transmitted by means of the pressure or thrust between the pistons 4 and the rotor 10. In the case of a pump, the rotor drives the pistons, and, in the case of an engine or motor, the pistons 4 drive the rotor 10.

When pressure is in a cylinder the thrust from the piston 4 is along the center line of the cylinder 6, and force is exerted on the connector, which force varies according to the angle of the swash plate but is along a line passing through the center where the connector 1 is hinged to the piston and is at right angles to the face of the swash plate 5 in the opposite direction to the thrust of the piston 4.

These two opposing forces produce a resultant force acting from the center of the connector hinge at right angles to the center line of the cylinder 6, and it is this force acting on the rotor 10 through the piston 4 that drives the rotor 10, in the case of a motor, and causes it to revolve.

If the center where the connector 1 is hinged to the piston 4 is outside the length of the cylinder 6 at any time, there is an overhang or cantilever action, and the resultant force acting at right angles to the center of the cylinder 6 and, therefore, of the piston 4, tends to tilt the piston in the cylinder 6 so that one part of the piston bears against the edge of the cylinder mouth on one side and the other end of the piston in the cylinder bears against the wall of the cylinder on the opposite side.

The direction of the tilt is transferred to different parts of the circumference as the cylinder 6 revolves and there is, therefore, a rimmering or vortex action of the piston 4 in its cylinder 6 (with very little except line bearing surface) which tends to produce wear therein.

In order to obviate this, the overhang of the spherical head 3 should be very slight or eliminated entirely.

It is an important feature of this invention that the center of the hinge of the connector to the piston 4 is always (or for the greater part of the stroke) in the cylinder 6 (or a guide formed as an extension of the cylinder) so as to avoid tilting action for the whole (or greater part) of the stroke and to allow the piston 4 to be pressed against one side of the cylinder wall, so that it can take an even bearing and present a large surface contact to prevent wear and give a smooth sliding action of the piston in its cylinder. This is very important, as the power is transmitted by the pressure between the piston and the cylinder wall.

In order to keep the resultant pressure always inside the cylinder 6, the stem of the connector 1 must be long enough to bring the center of the spherical head 3 inside the cylinder 6 at the outward end of the piston stroke. At the inward end it is, of course, the length of the piston stroke farther in.

The spherical end 3 of the connector stem 2 which enters the piston 4 may be secured in position by various means, such as a ring bush screwed into the piston to hold the spherical end in proper position, or the spherical end 3 may be inserted in the piston 4 and a thin portion of the piston 4 may be spun over the spherical end, or other mechanical methods may be employed.

In these cases, in a pump there is reversal of stress between the spherical end of the connector and the piston, as the piston is pushed into the cylinder by the connector during the delivery stroke and pulled out during the inlet stroke.

This is objectionable especially for high speed running machines, as noise and vibration are thereby set up.

In order to avoid reversal of stress, an induced pressure may be set up in the low pressure side of the system, for instance, by an auxiliary pump, sufficient to hold the piston 4 against the end 3 and the end 1$^a$ against the swash plate 5. This causes complications and, moreover, is not mechanically positive.

In order to prevent reversal of stress, it is necessary to provide means to hold the pistons 4 up to the connectors 1 and the connectors 1 up to the swash plate 5 during the outward stroke of the pistons 4.

It is also necessary to definitely hold the flanges 1$^a$ up to the swash plate 5 for the reason that, when no pressure is in the cylinders 6, the connectors being driven at the center of the spherical head 3 tend to tilt, and at such time the action of centrifugal force on the connector has the same effect.

One method is to provide springs in the cylinders which press against the pistons 4 and at all times hold them against the connectors 1 and the connectors 1 against the swash plate 5.

There are, however, objections to the use of such springs, as it is difficult to make them long enough to give sufficient motion without increasing the length and weight of the machine. The springs would be constantly opening and closing at high speeds thus shortening the life of the springs. Moreover, the minimum pressure at which the spring is set must be sufficient to hold the parts up to their work, and, therefore, at all other points of the compression of the spring the pressure would be greater than required, entailing loss of efficiency.

Other objections are the disturbance of the liquid in the cylinders and the action of centrifugal force on the springs.

One feature of the invention consists of construction whereby the flanges 1$^a$ are kept up to the swash plate 5 and the pistons 4 are kept up to the spherical ends 3 of the connectors without reversal of stress by means of a spring or springs that simply exercise a constant pressure without extending and compressing during the working of the machine.

In order to keep the flanges 1ª against the swash plate 5, it is preferable to provide a ring or retaining plate 11 surrounding the shaft 12 and pressing against the faces of the flanges 1ª remote from the swash plate 5, said retaining plate 11 being acted upon by a spring 13 to hold the connectors against the swash plate 5 without reversal of stress. The spring simply exercises a constant pressure and prevents the connectors 1 from tilting.

The face of the retaining ring 11 which presses against the flanges 1ª is always parallel to the face of the swash plate and may be non-rotatable, working on feathers or splines on the swash plate 5, and being held up to its work by a spring or springs, but preferably this ring 11 revolves on guides which are part of or are fixed to the swash plate.

The preferred method is shown in Figure 1 of the drawings, wherein a spherical portion formed on the shaft 12 or a semi-spherical collar 15 on the said shaft fits into a concave spherical seating which is part of or is attached to the retaining ring 11.

The spring 13 surrounding the shaft presses the collar 15 against the ring 11 and the ring 11 against the flanges 1ª and these against the swash plate 5; the shaft collar 15, spring 13, ring 11 and connectors 1 all revolve together.

In a single ended machine, as shown on the drawings, springs 14 are employed to keep the dummy or balancing pistons 16 up to their work.

When the swash plate 5 is at right angles to the axis of rotation there is no relative movement between the ring 11 and the collar 15 which forms a ball-and-socket joint, but at any other angle, the ring 11 oscillates on the ball as the parts revolve.

The center of this ball-and-socket joint should be situated about a half piston stroke within the length of the rotor, and in a variable capacity machine the swash plate 5 should swing about this point. Owing to the ball-and-socket joint, the ring 11 can take any angle in regard to the axis of rotation that the swash plate 5 takes.

The ring is preferably radially slotted, as at 11ᵇ, on its periphery to embrace the stems 2 of the connectors 1.

As there are a plurality of cylinders in such machines, there are a plurality of connectors 1, and it is difficult to insure the ring 11 bearing on all the flanges 1ª at the same time by relying only on accuracy of workmanship to avoid all back lash, as the ring 11 may press on some connectors and not entirely on others.

It is, therefore, prefered to make the ring 11 with the slots 11ᵇ which provide the interposed legs in the form of a spider, so that preferably two legs, one on each side of the slot, will press on each flange 1ª, one on each side of the stem 2, and as these legs have a slight amount of spring, each flange 1ª will receive a sufficient pressure to hold it up to the swash plate 5 without back lash.

The position of the center of the ball-and-socket joint of the ring 11 is very important, especially in a variable capacity machine, and should be on, or approximately on, a point on the axis of rotation that is cut by a plane passing through the centers of the connector hinges.

In other words, the center of the ball-and-socket joint is situated inside the length of the rotor about a half piston stroke from the mouths of the cylinders 6 or any extension thereof that may form a guide for the pistons 4.

An important feature of the construction according to the invention is the recessing of the rotor 10 as at 10ª, to receive the ball-and-socket joint, and in order to keep the rotor 10 as small as possible, portions of the cylinders 6 nearest to the axis of rotation may be cut through in making this recess.

This cutting of portions of the cylinders 6 has no disadvantageous effect as only the side nearest the center is cut away and the piston pressure does not bear on this side of the cylinder circumference until the piston is at, or nearly at, the inward end of its stroke, so that the resultant pressure acting between the piston and the cylinder wall acts beyond the cut away portion.

The method just described holds the flanges 1ª always up to their work without reversal of stress and prevents tilting of the connectors 1 or the pistons 4 in the cylinders by means of a spring or springs that simply exercise pressure without extending or compressing during the operation of the machine. This does not, however, hold the pistons 4 up to the spherical ends 3 of the connectors 1.

In order to prevent reversal of stress between the piston 4 and connector 1, the spherical head 3 is made hollow and provided with a concave spherical seating, preferably having the same center as the spherical end 3.

A small bolt 17 having a spherical or ball head 17ª which fits into the concave seating passes through a hole 18 in the head 3 and a hole 19 in the piston 4 into the body of the piston or beyond it.

The bolt is preferably screwed and provided with a nut 20 or its equivalent by means of which the surfaces of the end 3 and the piston 4 can be pulled together. A spring 21 is preferably interposed between the nut 20 and the piston 4 and this spring simply exercises a constant pressure to keep the working parts up to their work without reversal of stress, but the spring 21 does not elongate or compress during the working of the machine but keeps a constant length and moves with the piston 4 as part of it. The springs 21 may, therefore, be very short.

It is preferable to make the connector 1 with a tapered stem, the larger diameter being near the spherical end 3 and the smaller diameter near the flange 1ª in order to provide a stem long enough to keep the center of the spherical end 3 always (or for the greater part of the stroke) within the cylinder, and at the same time to allow the stem 2 to clear the piston 4 and cylinder 6 when the connector 1 is at its maximum angle.

This does not allow of a hole being formed through the stem 2 large enough to take the ball headed bolt 17 and give the necessary strength to the stem 2 as a column.

It is preferable, therefore, to make the connector in two (or more) parts, the spherical end piece 3 having a hole large enough to receive the ball headed bolt 17 and the flange end 1ª with part of the stem made to fit in and be fastened to the spherical end after the bolt 17 is in position as shown in Figure 1.

It will be seen that with the mechanism described and shown in the drawings there is little or no thrust between the flanges 1ª and the swash plate 5; that the thrust of the piston 4 is practically balanced by the hydraulic pressure in the system; that the working faces of the flanges 1ª are very thoroughly lubricated, that tilting of the connector 1 or of the pistons 4 in their cylinders 6 is avoided; that the pistons 4 present a long bearing surface so that a smooth sliding action of the pistons 4 in their cylinders 6 is insured, and that there is no reversal of stress between the working parts, the pistons 4 always being kept up to the connectors 1 and the connectors 1 to the swash plate 5 by means of springs that simply exercise pressure.

The conditions are, therefore, what they should be in order to obtain silent running and freedom from friction and vibration, which is especially desirable for high speed machines.

Figure 3:
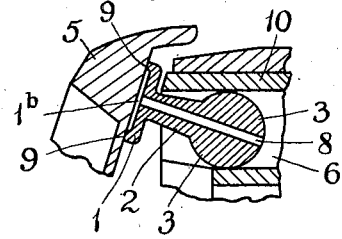
Figure 3 shows an alternative arrangement in which the connector itself acts as a piston.
Figures 4, 5:
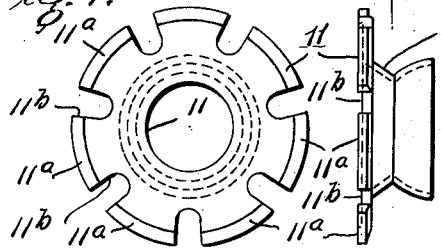
Figure 4 is a plan and Figure 5 is a side view of the retaining plate or spider for acting on the connectors.

The spherical collars 15 or their equivalents which keep the retaining ring or spider 11 up to its work may be used to locate the position of the rotor 10 and prevent its wandering endwise out of position in machines having pistons at each end of the rotor. Figure 3 shows an alternative arrangement in which the spherical end 3 acts as a piston. The connector hinges in the cylinder 6 to any angle and the liquid under pressure from the cylinder 6 passes through a hole 8 in the connector 1 to act between the faces of the flange 1ª and the swash plate 5.

What I do claim as my invention and desire to secure by Letters Patent is:—

1. In a machine of this character, the combination with a rotor having a plurality of reciprocating pistons mounted therein, a stator surrounding the same, a swash plate fixedly mounted within the stator, a shaft for rotating the rotor or to be rotated thereby, a plurality of connectors one to each piston and each connector consisting of a circular base, a stem projecting therefrom, and a ball carried by the stem, said ball being connected to its respective piston through a ball-and-socket joint and said connector being provided with a channel therethrough whereby the lubricant for the various elements is forced through said channel to lubricate the base and the adjacent portion of the swash plate during the rotation of the rotor.

2. In a machine of this character, the combination with a rotor having a plurality of reciprocating pistons mounted therein, a stator surrounding the same, a swash plate fixedly mounted within the stator, a shaft for rotating the rotor or to be rotated thereby, a plurality of connectors one to each piston and each connector consisting of a circular base, a stem projecting therefrom, a ball carried by the stem, said ball being connected to its respective piston through a ball-and-socket joint and said connector being provided with a channel therethrough whereby the lubricant for the various elements is forced through said channel to lubricate the base and the adjacent portion of the swash plate during the rotation of the rotor, and a spacing member for the connectors provided with a slotted peripheral flange and with resilient terminals between the slots for engaging the swash plate, the stems of the connectors being disposed within the slots thereof.

3. In a device of this character, the combination with a casing, a shaft journaled therein, a rotor connected to the shaft and provided with a plurality of parallel radially disposed bores, a plurality of reciprocating pistons one mounted in each of said bores, each of said pistons being provided with a socket in the outer end thereof, a swash plate fixedly mounted within the stator, a plurality of connecting elements between the pistons and the swash plate and bodily rotatable with the rotor, each of said connectors consisting of a mushroom shaped member having a ball at one end, said ball being mounted in the socket of its respective piston for oscillatory movement relative thereto, tensioning means connected to the piston and the respective ball end to hold the same seated within the socket to prevent undue back lash, the flat end of each connector being frictionally held in engagement with the swash plate, and spacing means for the connectors rotatable with the stator and in frictional contact with the swash plate.

4. In a device of this character, the combination with a casing, a shaft journaled therein, a rotor connected to the shaft and provided with a plurality of parallel radially disposed bores, a plurality of reciprocating pistons one mounted in each of said bores, each of said pistons being provided with a socket in the outer end thereof, a swash plate fixedly mounted within the stator, a plurality of connecting elements between the pistons and the swash plate and bodily rotatable with the rotor, each of said connectors consisting of a mushroom shaped member having a ball at one end, said ball being mounted in the socket of its respective piston for oscillatory movement relative thereto, tensioning means connected to the piston and the respective ball end to hold the same seated within the socket to prevent undue back lash, the flat end of each connector being frictionally held in engagement with the swash plate, and spacing means for the connectors rotatable with the stator and in frictional contact with the swash plate, each of said connectors being provided with a central bore open to the flat end and through which lubricant is fed from the cavity of the piston to the contacting surfaces of the connectors and swash plate.

In testimony whereof I have hereunto set my hand.

ROBERT FALKLAND CAREY.